United States Patent [19]

Murray et al.

[11] 4,023,081
[45] May 10, 1977

[54] PLURAL MOTOR DRIVE SYSTEM

[75] Inventors: James E. Murray, University Heights; Robert J. Resch, Chardon, both of Ohio

[73] Assignee: Cyberex Incorporated, Mentor, Ohio

[22] Filed: Mar. 3, 1975

[21] Appl. No.: 554,664

[52] U.S. Cl. .............................. 318/109; 318/112; 307/127

[51] Int. Cl.² ........................................ H02P 1/58

[58] Field of Search ............ 318/112, 106, 109, 55, 318/441, 442; 307/127

[56] References Cited

UNITED STATES PATENTS

| | | | |
|---|---|---|---|
| 1,248,484 | 12/1917 | Hall | 318/109 |
| 3,562,612 | 2/1971 | Munson | 318/106 |
| 3,585,470 | 6/1971 | Connors | 318/112 X |

*Primary Examiner*—B. Dobeck
*Attorney, Agent, or Firm*—Woodling, Krost, Granger & Rust

[57] ABSTRACT

A common bus energization system is disclosed with first and second bus conductors across which a plurality of individual loads may be connected in parallel. Each of the loads is inductive and is capable of operating on direct current, for example, universal or shunt field DC motors, permanent magnet motors, magnetic particle clutches, eddy current clutches, relays, solenoids and the like. Voltage source means is provided to supply a resultant voltage to the first and second bus conductors. This voltage source means includes first and second sources with the first source connected to supply a large, positive voltage on the first conductor and the second source connected to supply a negative voltage on the first conductor. These two voltage sources are alternated with the first source effective a greater period of time for a net average polarity of positive on the first conductor. Each load, such as a motor, has a controllable semi-conductor connected to it to control the current through the motor. If the motor has a locked rotor or for some reason fails to develop a counter e.m.f., this polarity reversal of the resultant voltage insures that all motor control semi-conductors will stop conducting and recover their forward blocking characteristics. The retriggering of each individual motor control semi-conductor individually controls the speed or other characteristic of each motor. The foregoing abstract is merely a resume of one general application, is not a complete discussion of all principles of operation or applications, and is not to be construed as a limitation on the scope of the claimed subject matter.

16 Claims, 9 Drawing Figures

PLURAL MOTOR DRIVE SYSTEM

BACKGROUND OF THE INVENTION

The typical motor control system where the motor is to be controlled in some variable such as speed, voltage or current is a control system wherein there is one control circuit for each individual motor to be controlled. This results in a relatively high proportion of the total cost being due to the control circuit. A prior art attempt at an energization system wherein there was a thyristor control of individual motors supplied from a common power supply, required the complexity of superimposing a high-frequency control signal onto the commercially available power frequency on the two bus conductors. This required the complexity of high-frequency control signals in addition to supplying AC on the bus conductors rather than DC. The prior art has proposed use of variable speed DC motors operable from a voltage rectified from an AC source and controllable by means such as saturable reactors. However, in such systems plural motor loads were not able to be controlled individually, and at no time was there a net negative voltage applied on the normally positive bus conductors. Still another prior art motor control circuit took into account the counter e.m.f. and compared this counter e.m.f. with a trigger voltage, yet such circuit did not take into account what might happen if no counter e.m.f. was developed. Still other motor control circuits have utilized DC motors which are adjustable in speed and which are supplied from two separate voltage sources connected generally in opposition for control purposes, yet they did not provide a periodically changed voltage on the bus conductors nor did they provide for controlling the speed individually of different loads.

SUMMARY OF THE INVENTION

The invention may be incorporated in a common bus energization system comprising, in combination, a first bus conductor, a second bus conductor, means for connecting a plurality of individual loads in parallel between said bus conductors, said loads including reactances capable of operating on direct current and a controllable semi-conductor connected to control the current therethrough, voltage source means including first means connected to supply a first unidirectional voltage between said first and second bus conductors which for a majority of the time is positive on said first conductor, and said voltage source means including second means to establish a second voltage between said first and second bus conductors to establish with said first voltage a resultant voltage positive on said first conductor for a majority of time and negative on said first conductor for a minority of time for a net average polarity of positive voltage on said first conductor.

An object of the invention is to provide a common bus energization system wherein a plurality of motors may be energized from common bus conductors yet with each motor having an independent speed.

Another object of the invention is to provide a common bus energization system wherein there is an economy of components yet no compromise in the ability to control the speed of plural motors.

Another object of the invention is to provide a common bus energization system wherein a variety of electrical inductive loads may be supplied such as motors, magnetic clutches, relays, and the like, each individually controllable.

Another object of the invention is to provide a common bus energization system wherein two separate voltage sources are provided, one providing periodically a negative voltage to permit controllable semiconductors each controlling an individual motor to recover forward blocking characteristics.

Other objects and a fuller understanding of the invention may be had by referring to the following description and claims, taken in conjunction with the accompanying drawing.

DESCRIPTION OF THE PREFERRED EMBODIMENTS

Figure 1:
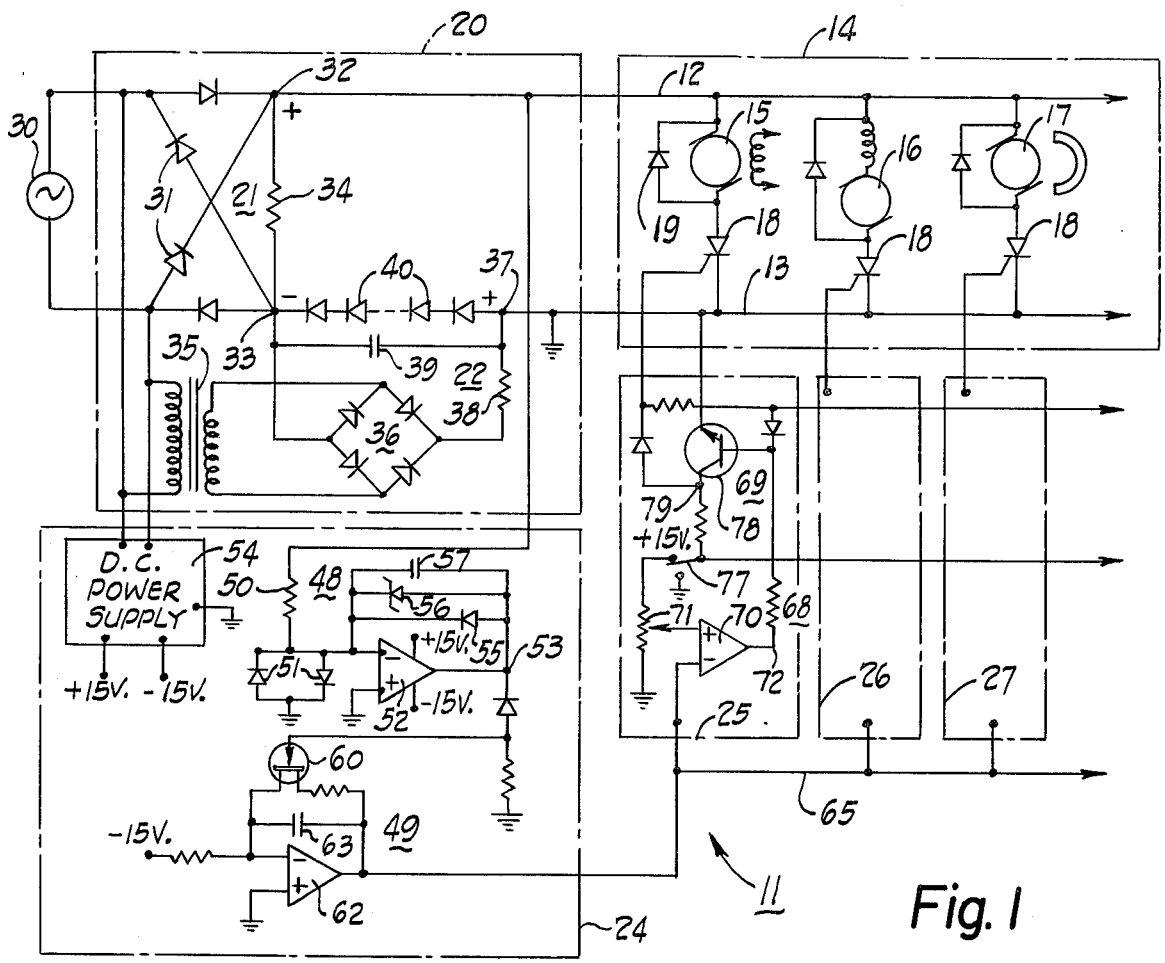
FIG. 1 is a schematic diagram of a preferred embodiment of the invention.

FIG. 1 shows one of the preferred embodiments of the invention and shows a common bus energization system 11 which energizes a first and a second bus conductor 12 and 13, respectively. Loads 14 are connected between the bus conductors 12 and 13, and these loads 14 include means for connecting a plurality of individual loads in parallel between the bus conductors. FIG. 1 illustrates three such individual loads, 15, 16 and 17. Each of these loads includes an inductive reactance capable of operating on direct current and also includes a controllable semiconductor 18 connected to control the current through the individual loads 15–17. As shown in FIG. 1 the controllable semiconductor 18 is connected in series with each individual load for the control of this current and the semiconductor is shown as a thyristor.

The loads 15–17 are reactive and in particular are inductively reactive. Accordingly, a fly-back diode 19 is connected across the loads 15–17 to conduct current through the load 15, for example, in the same direction through that load as when current was being conducted by the thyristor 18.

Voltage source means 20 includes first means 21 and second means 22 which are connected to supply a resultant voltage between the first and second bus conductors 12 and 13. The first means 21 is connected to supply a first unidirectional voltage between the bus conductors which for a majority of the time is positive on the first conductor 12. The second means 22 of the voltage source means 20 establishes a second voltage between the bus conductors and coacts with the first means to establish a resultant voltage which is positive on the first conductor for a majority of time and negative on the first conductor for a minority of time for a net average polarity of a positive voltage on the first conductor 12. A main control circuit 24 is provided for all loads and individual control circuits 25, 26, 27, are provided for control of a condition of the individual loads 15, 16 and 17, respectively.

The voltage source means 20 actually includes first and second voltage sources 21 and 22. In FIG. 1 this first voltage source 21 is shown as being supplied from an AC source 30 which is rectified by at least a half-wave rectifier and preferably a full-wave rectifier. This may be a centertapped transformer and two diodes or, as shown, may be a fourdiode rectifier bridge 31. This rectifier bridge has output terminals 32 and 33, with terminal 32 being positive and connected to the first bus conductor 12. The second output terminal 33 is negative and connected indirectly to the second bus conductor 13. An optional resistance 34, preferably a high resistance such as 500 ohms may be connected across the terminals 32 and 33.

The second voltage source 22 develops a unidirectional voltage and conveniently is also operable from the AC source 30. The second voltage source 22 may be most any convenient source which develops a unidirectional voltage such as half-wave rectifier or preferably a full-wave rectifier as shown. Again, this may be a centertapped transformer winding with two diodes or, as shown, may include the transformer 35 and a bridge rectifier 36 having unidirectional output terminals 33 and 37. A filter consisting of a low-resistance 38 and a parallel capacitor 39 is connected across the output of the bridge 36 to develop a substantially constant DC voltage across the output terminals 33 and 37. A series string of diodes 40 is connected across the output terminals 33 and 37 in order to establish, by their forward voltage drop, the second voltage of this second voltage source 22.

The polarity of the first and second voltages developed by the first and second voltage sources are connected in series opposition, as shown in FIG. 1. Merely by way of example, the Ac source 30 might be 230 volts Ac developing about 230 volts effective value of Dc voltage across the output terminals 32 and 33. The second voltage source 22 may have a transformer secondary voltage of perhaps 9 or 10 volts Ac, which, after being rectified and filtered will develop 10.5 volts Dc across a series string of fifteen of the diodes 40. This will establish a resultant output voltage of the voltage source means 20, at output terminals 32 and 37, which appears as in FIG. 3 as a full-wave rectified voltage 43 wherein the output voltage is shown plotted against time and with negative cusps 44 equal to the second voltage. In the above example this would be minus 10.5 volts. This value in not critical, but 10 volts has been found sufficient for the purpose.

The loads 14 are shown as something which as reactance, more specifically, inductive reactance, and may be electric motors. The load 15 is shown as a Dc shunt motor, load 16 is shown as a series or universal motors and load 17 is shown as a commutator motor having a permanent magnet field. Each of these types of motors is quite suitable as a load energized by this energization system 11. With a motor as a load, and the motor running, there will normally be a counter e.m.f. 45, see FIG. 6, developed by the motor, depending upon the speed of the motor. During normal operation the thyristors 18 may conduct only when the output voltage 43 exceeds the counter e.m.f. However, it is contemplated that this energization system may supply many motor loads, for example, 100 or 200 small motors on a textile machine with each motor encountering variable loads depending upon the position of the yarn winder, for example. With each motor having a variable load it is also desirable to have a controllable speed for each motor, and this is provided by the present energization system 11. During normal running operation of the motor load, whenever the output voltage 43 is less than the counter e.m.f. 45, then the thyristor 18 cannot conduct because its anode voltage would be negative relative to the cathode. Also, this gives time for the thyristor 18 to achieve forward-blocking characteristics, ready for the gating signal on the next half-cycle. However, this present invention goes further than merely providing for normal conditions. Negative cusps 44 are provided deliberately in the output voltage 43 so that should a Dc motor fail to revolve, or should such motor lose field excitation, and thus not develop any counter e.m.f., the present energization system would still achieve turnoff of the thyristor 18 involved. This can be quite important in a number of situations including the abovementioned textile machine. Should one motor develop a locked rotor or stall due to an overload, control of the individual thyristor 18 can still be achieved. One stalled motor out of 200 might not be noticed immediately, and the present system 11 can avoid this dangerous condition.

Figure 3:
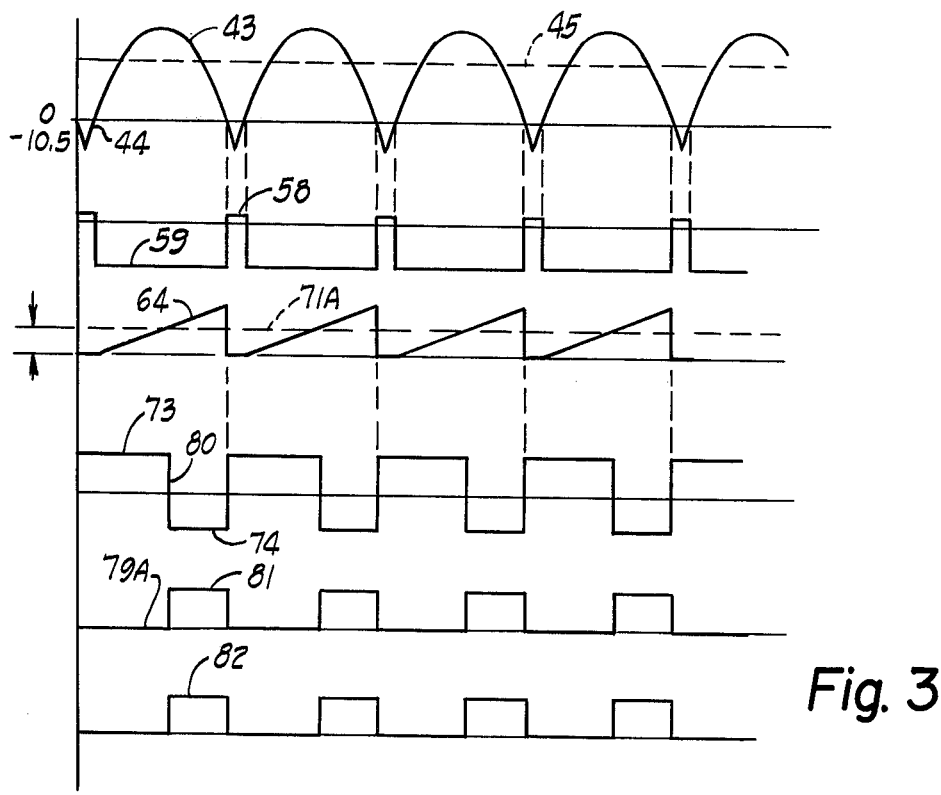
FIGS. 3 and 4 are voltage versus time curves to help explain FIGS. 1 and 2.

Many different control circuits may be provided for the loads 14 and the main control circuit 24 and the individual circuits 25–27 are merely one example of an operable circuit. The thyristors 18 have their firing pulses applied to the gates synchronized with the Ac source 30 or more particularly with the negative cusps 44 of the output voltage 43. To this end the main control circuit 24 includes a zero crossing pulse source 48 and a ramp generator 49. The pulse source 48 is energized from the first bus conductor 12 through a resistor 50 and opposedly connected diodes 51 to supply the input to an amplifier 52. Diodes 51 prevent any voltage larger than 0.7 volts, plus or minus being applied to the inverting input of the amplifier 52. Accordingly, the output of amplifier 52 at terminal 53 is normally about minus 12 volts, assuming a plus and minus 15 volt supply voltage from a Dc power supply 54. From the output terminal 53 back to the inverting input, there is connected a diode 55, a zener diode 56, and a small capacitor 57. Diode 55 merely assures that the output at terminal 53 cannot go positive and the zener diode 56 establishes the value of the output voltage, as stated above, being about minus 12 volts. This is a voltage 59 as shown in FIG. 3 which voltage periodically goes positive by a very slight amount as shown at portion 58 of the curve in FIG. 3. Such slight positive portion 58 occurs in synchronism and in phase with the negative cusps 44, as the diodes 51 provide a negative input voltage momentarily to the amplifier 52.

The output voltage 59 from the pulse source 48 is supplied to the ramp generator 49. This may be of many different types and the circuit shown includes an FET switch 60 with the signal applied to the gate thereof. The source and drain of the switch 60 are connected across the input and output of an amplifier 62. A fairly large capacitor 63 is also connected across the input and output of this amplifier to make it act as an integrator so that it generates a ramp voltage 64 as shown in FIG. 3. The negative output voltage at terminal 53 means that the FET switch 60 is normally off, but when terminal 53 goes slightly positive at the portions 58, the switch is effectively closed and this discharges the capacitor 63 so that when the switch 60 again opens, the ramp voltage 64, see FIG. 3, starts to increase. This ramp voltage appears on a ramp voltage conductor 65 which is connected to all of the individual control circuits 25, 26 and 27. These control circuits may be all alike for simplicity and economy and only control circuit 25 has been shown in detail.

The control circuit 25 may be any one of many different circuits to individually control the thyristor 18 and FIG. 1 shows that this circuit 25 includes generally a comparator 68 and a gate control 69. The comparator 68 includes an amplifier 70 with the inverting input connected to the ramp voltage conductor 65 and the non-inverting input connected to be variably energized by a positive Dc voltage. This may be a manually controlled voltage, although in many cases it will be some automatically controlled voltage, controlled in accordance with some condition of the motor such as speed, voltage or current. In FIG. 1 this non-inverting input is shown as being provided from a potentiometer 71 and this will establish a variable level control voltage 71A as shown in FIG. 3. At the crossing point of the ramp voltage 64 and the control voltage 71A, the output of amplifier 70 at terminal 72 will change in polarity. When the ramp voltage is less than the control voltage 71A, then there is a net positive input to amplifier 70 so it will have a positive output voltage 73 at terminal 72, see FIG. 3. When the ramp voltage 64 exceeds the control voltage 71A, there will be a net negative voltage input to amplifier 70 so the output at terminal 72 will be negative, as shown at portion 74 in FIG. 3.

A switch 77 controls Dc power to all of the gate controls 69 in the various individual controls 25–27. When this switch is connected to the positive 15 volt Dc power supply, a transistor 78 in the gate control 69 will be normally conducting. When conducting, transistor 78 establishes a voltage 79A at a terminal 79 which is practically at zero voltage, and hence this shorts any signal to the gate of the thyristor 18. At point 80 when the output of the comparator 70 goes negative, this turns off the transistor 78 to establish a positive voltage 81 at the transistor output terminal 79. This positive voltage then is a gate signal to fire the thyristor 18, and the gate signal 82 is as shown in FIG. 3. By varying the amplitude of the control voltage 71A at potentiometer 71, this controls the firing point of the thyristor 18.

It will be observed that an increase of the amplitude of the positive control voltage 71A from potentiometer 71 will delay the firing angle of the thyristor 18 for a reduced energization to the motor load 15. From the above it will be noted that the firing point of the thyristor 18 is synchronized with the negative cusps 44 of the voltage source means 20, which has an output at terminals 32 and 37 which is the resultant of the first voltage source 21 and the second voltage source 22. In circuits actually constructed in accordance with this invention, it has been observed that each motor load may be controlled independently in speed, voltage, current or torque; and the mechanical loads on these motors may also vary independently with complete control of each motor load from the energization system 11.

Figure 2:
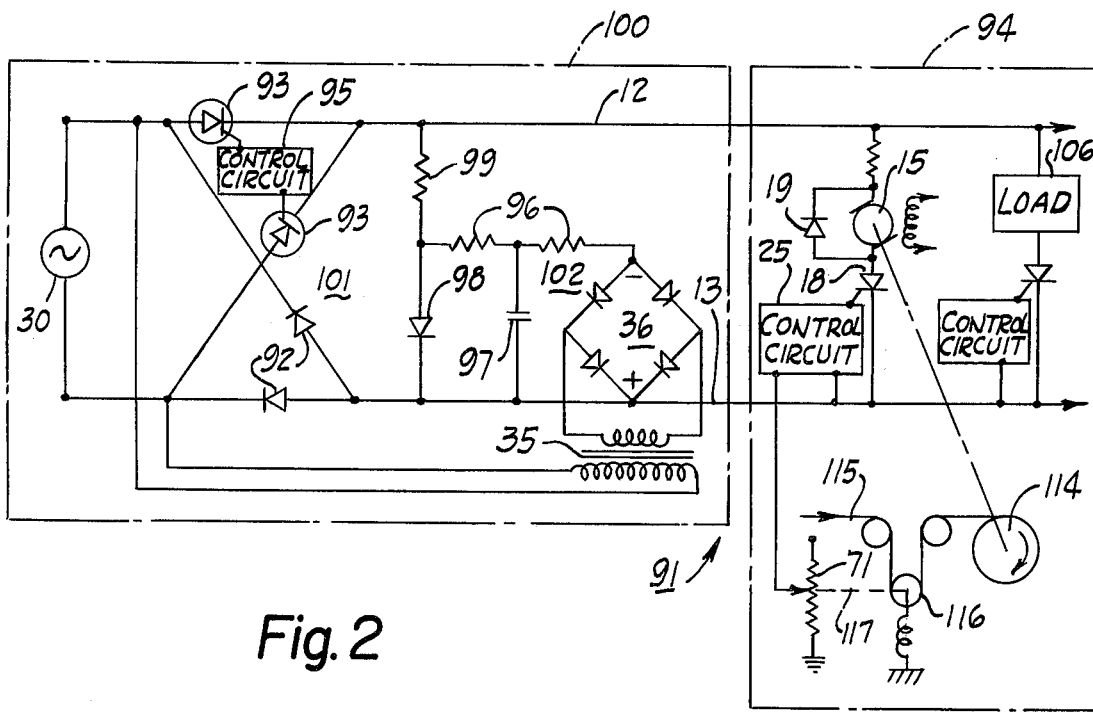
FIG. 2 is a schematic diagram of a modification of the invention.

FIG. 2 shows a modified common bus energization system 91 to energize first and second bus conductors 12 and 13 again connected to loads which may be the same loads 14 but shown this time as loads 94. Voltage source means 100 includes first and second voltage sources 101 and 102 to establish first and second voltages, respectively, which are combined as a resultant voltage on the first and second bus conductors 12 and 13. The voltage first means 101 includes a main power rectifier bridge operating from an Ac source 30. Again, this may be a centertapped transformer with two controllable rectifiers, but is shown as a bridge rectifier with diodes 92 and controllable semiconductors 93. These semiconductors 93 are shown as thyristors controlled by a control circuit 95.

The voltage source second means 102 includes the transformer 35 and a full wave rectified output therefrom, in this case shown by the rectifier bridge 36 with a filter consisting of resistors 96 and capacitor 97. The Dc filtered output is supplied across a diode 98. A resistor 99 is connected in series with diodes 98 across the first and second bus conductors 12 and 13.

The load 94 connected to the voltage source means 100 may be most any form of reactive load and is shown as an inductive reactive load which includes a shunt motor 15 and another inductive reactive load 106. The motor 15 has connected in series therewith the thyristor 18 for control of the current to the motor 15 and the thyristor is controlled by the control circuit 25.

Figure 4:
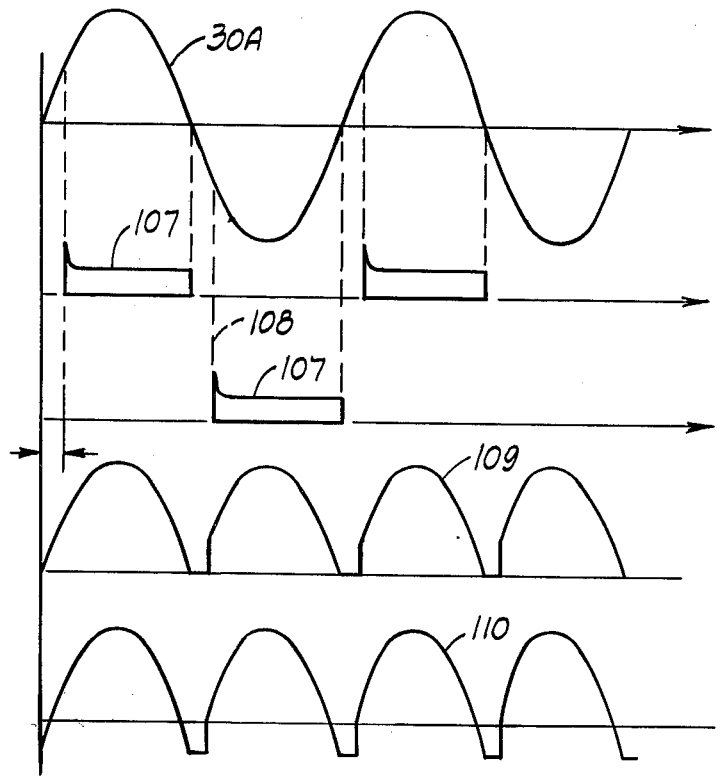

In operation, the circuit of FIG. 2 achieves a resultant voltage across the first and second bus conductors 12 and 13 which is positive on the first bus conductor 12 for a majority of the time and is negative on the first conductor 12 for a minority of the time, yet with a net average polarity of a positive voltage on the first conductor. The control circuit 95 may be a conventional timing circuit for the thyristors 93 and 95 wherein the gating is not varied in phase during normal operation. This gating, however, is delayed by a small amount, e.g., one millisecond, however, the delay time is not critical. FIG. 4 shows a voltage 30A which may be considered the voltage of the Ac source 30. FIG. 4 also shows gate firing voltages 107 applied to the two thyristors 93 by the control circuit 95. This shows the delay period at 108, which is the short, e.g., one millisecond delay, after the zero crossing of the Ac voltage. The rectified output appearing across resistor 99 is shown by the voltage curve 109. This delayed gate signal to the thyristor 93 means that thyristor already conducting will continue to conduct through into its negative one-half cycle until it turns off or alternatively unitl the auxiliary negative bias supply 102 takes over. In either case, the common bus output to the loads 94 will be subjected to a resultant negative voltage for a short time interval. During the positive half-cycles the resistor 99 and diode 98 disable the negative power supply 102 by shorting or shunting it since the positive current through resistor 99 will be greater than the negative current through the resistors 96. Accordingly, the power delivered by the thyristors 93 will normally be unaffected by the negative supply voltage 102. During the one millisecond delay period at the start of each one-half cycle, the negative supply 102 will become effective and establish e.g., 10 volts negative on bus conductor 12. This will result in the voltage curve 110 shown in FIG. 8 which is the voltage across the bus conductors 12 and 13. This turn-off of the main thyristors 93 for this short delay period will establish the negative voltage on bus conductor 12. This means that each thyristor 18 in series with each motor 15–17 or other inductive load, will be turned off because such thyristor 18 will be allowed to recover its forward blocking characteristics. This will be true whether or not the motor or load has developed any e.m.f., and thus the energization system 91 provides a safe and efficient means of control of a plurality of loads which are individually variable in speed, voltage, or other condition.

The loads 94 may be a plurality of motors, electrical clutches and the like and the motor load 15 has been shown as driving a yarn winder 114 with the yarn 115 passing over a dancer roll 116. The dancer roll 116 has a mechanical connection 117 to the movable blade of the potentiometer 71 which is connected to control the control circuit 25. If the motor 15 is not turning rapidly enough to wind up the yarn as it comes from some processing machine, then the dancer roll 116 would move downwardly. This decreases the voltage from potentiometer 71 and as shown from FIGS. 1 and 3 this increases the energization to the thyristor 18 to increase the speed of motor 15. This is merely representative of one control configuration which may be used for the loads 94.

Figure 5:
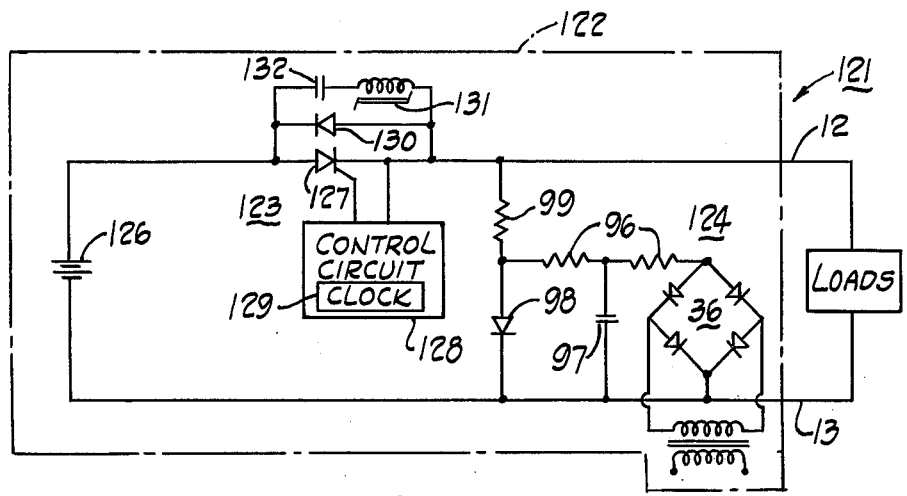
FIG. 5 is a schematic diagram of a modification of the invention.

FIG. 5 shows another modification of a common bus energization system 121 supplying power to the first and second bus conductors 12 and 13, but the specific load connected thereto is not shown, since this load may be any one or more loads as the loads 14 or 94. This energization system 121 includes the voltage source means 122 with a first means 123 and a second means 124 to develop first and second voltages. The voltage second means 124 may be the same as the second means 102 in FIG. 2. The voltage source first means 123 is a chopper operable from some relatively smooth Dc input source 126 illustrated as a battery. In actual practice it usually would not be a battery, and it may in fact by a full-wave rectifier plus filters to achieve this relatively smooth Dc input. The chopper includes some controllable unidirectional conducting device shown in here as a thyristor 127 controlled by a control circuit 128. The control circuit 128 includes a clock 129 to develop an internal frequency which is unrelated to any commercially available power frequency, e.g., 60 hertz. This clock 129 might develop a frequency of 500 hertz, for example. The voltage source first means 123 is a chopper, namely the semiconductor 127 conducts for a certain length of time and then is chopped off or rendered non-conducting. During these non-conducting periods the voltage source second means 124 is effective to establish a small negative voltage on the conductor 12. The chopper circuit 123 may be of many forms and a Morgan circuit chopper is disclosed wherein there is connected across a thyristor 127 a diode 130 and a commutating circuit of a saturating inductance 131 and capacitance 132. If a transistor were used in place of the thristors 127, then such auxiliary turn-off circuits or commutation circuits would not be required.

Figure 6:
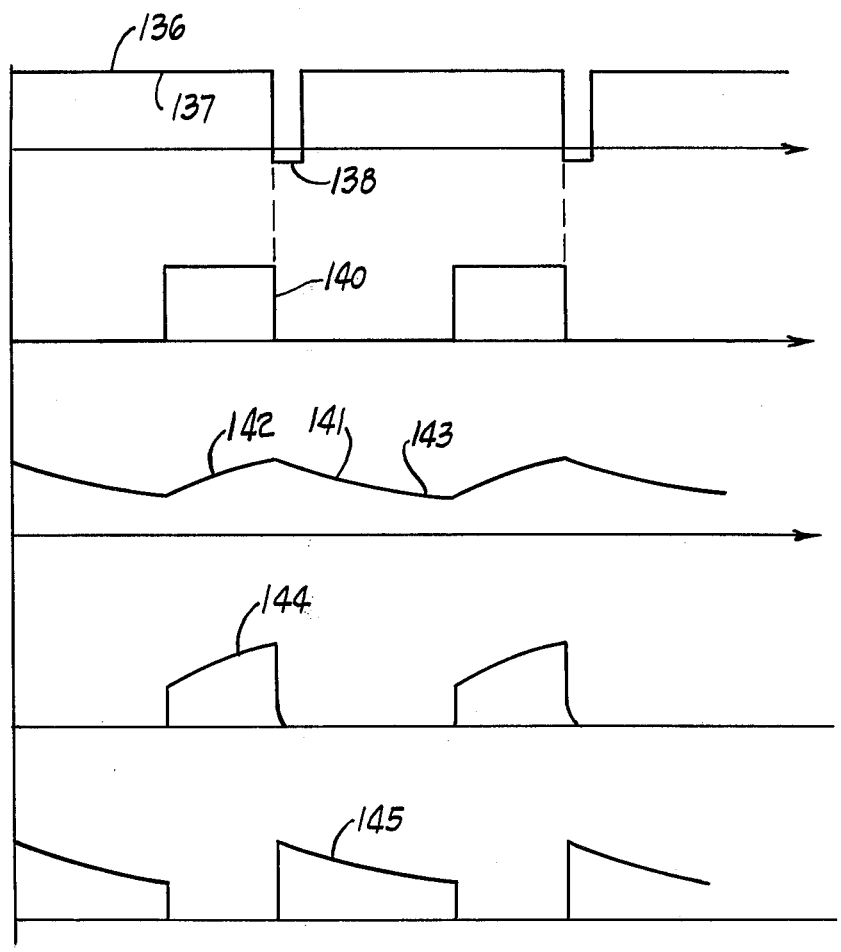
FIG. 6 is a voltage versus time curve to help explain FIG. 5.

The voltage from the voltage source means 122 of FIG. 5 is as shown on a voltage curve 136 in FIG. 6 with positive portions 137 when the first means 123 is effective and negative portions 138 when the second means 124 is effective. This second means 124 is effective whenever the first means 123 is off, as controlled by the control circuit 128. The positive portions 137 may be about 90 to 98 percent of the total time and the negative portions 138 may be about 2 to 10 percent of the total time for a net average polarity of a positive voltage on the first conductor 12. If the periodic rate at which the first and second means are effective is 500 hertz, for example, then the positive portions 137 will be nearly 2 milliseconds long, and the negative portions 138 may be in the order of only about 200 microseconds. This need be long enough only so that the thyristors 18 in series with the motor loads achieve forward blocking characteristics. If the switching frequency of the clock 129 is high enough, such as positive for two milliseconds and negative for 200 microseconds, current to the motor will be fairly smooth due to the motor inductance. FIG. 6 illustrates a curve 140 of a particular duty cycle for a given motor condition. The motor current will be as illustrated in curve 141 in FIG. 6 with increasing current portions 142 as the thyristor 18 conducts current and with decreasing portions 143 when the thyristor 18 is not conducting. Curve 144 in FIG. 6 illustrates the gate current to the thyristor 18 and curve 145 illustrates the current through the flyback diode 19.

Figure 7:
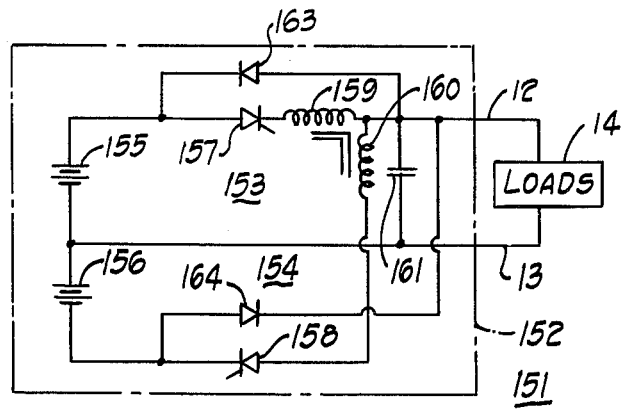
FIGS. 7, 8 and 9 are schematic diagrams of further modifications of the invention.

FIG. 7 shows another embodiment of a common bus energization system 151. This includes a voltage source means 152 with first means 153 and second means 154 developing a resultant voltage on the first and second bus conductors 12 and 13. Again, the loads 14 are not shown in detail but may be any load similar to loads 14 of FIG. 1 or loads 94 of FIG. 2. The voltage source means 152 is a chopper voltage source with the first means 153 establishing a positive voltage on conductor 12 at a periodic rate and the second means 154 establishing a negative voltage on this conductor 12. The voltage source means 152 is operable from Dc voltage sources 155 and 156 which again are shown as batteries for convenience. This circuit of FIG. 7 is a one-half bridge configuration utilizing a McMurray-Bedford auto-commutated circuit. The voltage source first means 153 includes a thyristor 157 and the second means 154 includes a thyristor 158. A commutating circuit is provided by inductances 159 and 160 in series with the thyristors 157 and 158, respectively, and a capacitor 161 connected across the bus conductors 12 and 13. Commutating diodes 163 and 164 are connected in the opposite direction across the series combination of a thyristor and its inductance. In the chopper circuit of FIG. 7 the negative voltage from the second means 154 may be of the same magnitude as the positive voltage from the first means 153 in order to achieve satisfactory commutation. The ampere capacity of the components in the second means 154 need not be as large, however, as that in the first means 153, since this negative power supply of the second means 154 does not supply any appreciable power to the loads 14. The graphs of voltage and currents may be similar to those in FIG. 6 except the negative portion 138 will be equal in magnitude to the positive portion 137.

Figure 8:
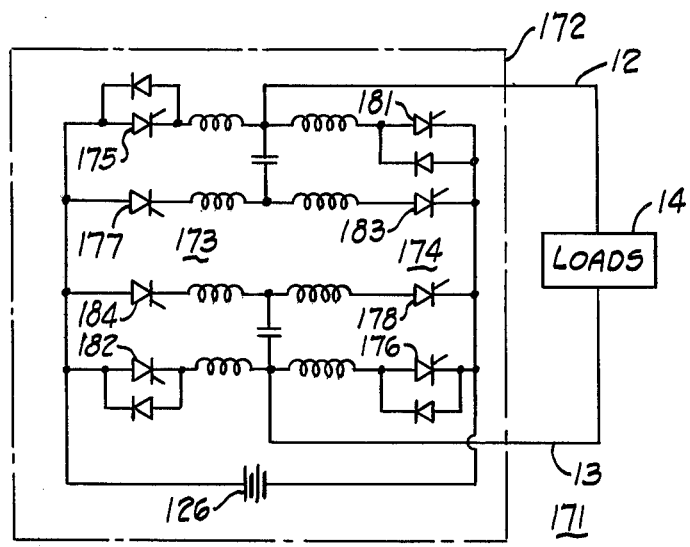

FIG. 8 illustrates another modification of an energization system 171 with voltage source means 172 which has first means 173 and second means 174 to develop positive and negative voltages, respectively, on the first bus conductor 12. This voltage source means 172 is a full bridge chopper circuit of the auxiliary commutated McMurray type. The voltage source first means 173 includes main thyristors 175 and 176 which will conduct to establish from the Dc supply source 126, a positive voltage on bus conductor 12 relative to bus conductor 13. Auxiliary or commutating thyristors 177 and 178 are also included in the voltage source first means 173.

The voltage source second means 172 includes main thyristors 181 and 182 to establish on bus conductor 12 a negative voltage from the Dc power supply 126. This second means 174 also includes commutating thyristors 183 and 184. This auxiliary commutated McMurray type chopper is well documented in the literature, so the description of the commutation of such circuits is omitted here.

In operation, the full bridge chopper circuit of the energization system 171 will provide voltage and current similar to that shown in FIG. 6, with the exception that the negative portion 138 of the voltage curve 136 will normally have an amplitude equal to the positive portion 137.

Figure 9:
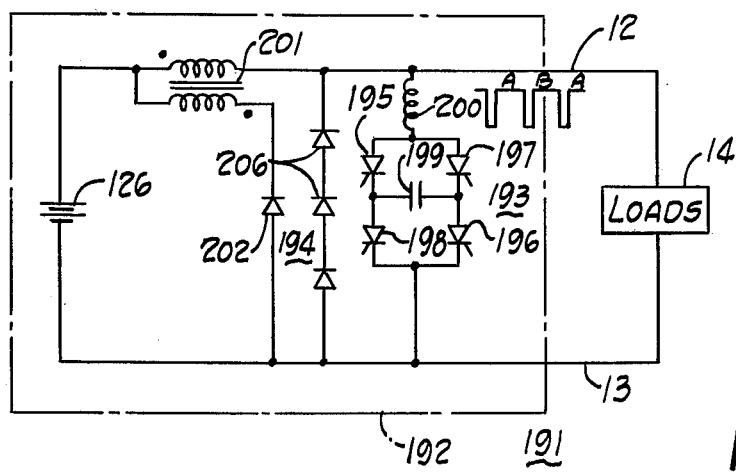

FIG. 9 shows another modification of an energization system 191 which has voltage source means 192 acting as a shunt chopper including first means 193 and second means 194 for establishing positive and negative voltages, respectively, on the first bus conductor 12. The first means 193 includes thyristors 195 and 196 which fire as a pair, and thyristors 197-198 which fire an an alternative pair. These thyristors are in a bridge configuration with a capacitor 199 connected across the output of the bridge and the input of the bridge connected through a commutating inductance 200 to be across the bus conductors 12 and 13. A commutation transformer 201 and a diode 202 supply commutating signals to the gates of the thyristors 195-198. The second means 194 of the voltage source 192 includes a series string of diodes 206 with three being shown but this is merely representative of enough diodes to achieve enough forward-voltage drop to establish satisfactory negative voltage on bus conductor 12 to achieve turn-off of the thyristor 18.

In operation, the thyristors 195 and 196 conduct as a pair to establish a positive voltage on the left side of capacitor 199 from the Dc source 126. This positive voltage, less the voltage drops across the inductance 200 and the thyristors 195 and 196, appears as the positive voltage on the bus conductor 12. This would be similar to the positive portion 137 of the voltage curve 136 of FIG. 6.

Next, when the thyristors 195 and 196 are commutated off, the series string of diodes 206 establishes a small negative voltage on bus conductor 12, similar to the negative portion 138 of voltage curve 136 of FIG. 6. This will be for only a short period of time, for example, 200 microseconds. Next, when the thyristor pair 197 and 198 conduct, this establishes a positive voltage on the right-hand side of capacitance 199 which appears as a positive voltage on bus conductor 12. Again, when the thyristor pair 197 and 198 are commutated off, during this off-commutation period, a small negative voltage is developed on bus conductor 12 in accordance with the forward voltage drop across the diode string 206.

All of the circuits shown in FIGS. 5 and 7-9 may be considered high frequency-low ripple type of circuits which can significantly reduce the Dc motor current ripple when the motors are subjected to variable gating control via the control thyristors 18. The circuits of FIGS. 1 and 2 have the advantage of being simpler from a control standpoint. Also, the circuits of FIGS. 1 and 2 simply use the sinusoidal nature of the commercially available Ac source to produce the polarity reversal required in the common bus energization systems. The circuit of FIG. 2 has an advantage over the circuit of FIG. 1 in the reduction of the number of semiconductors which must carry large values of current. In FIGS. 1 and 2 the first means 21 and 101 will need to have semiconductors of large amperage carrying capacity, equivalent to the total current required by the loads 14 and 94. Such large current carrying capacity is also required of the diodes in the diode string 40 of FIG. 1. However, the current rating of the diodes in the bridges 36 in FIGS. 1 and 2 may be quite small because these components do not supply any appreciable amount of power to the loads 14 and 94, they merely provide a negative voltage periodically on conductor 12, but do not supply any appreciable current to the load because of the unidirectional nature of these loads.

The many circuits of FIGS. 1, 2, 5, 7, 8 and 9 illustrate a number of embodiments of the energization system of the invention. Each of these circuits establishes a resultant voltage on the bus conductors which is positive on the first conductor for a majority of time and negative on that first conductor for a minority of time. This is a net average polarity of a positive voltage on the first conductor with the negative voltage portion of the resultant voltage periodically on this first conductor assuring that the controllable semiconductor 18 connected in series with the load ceases conduction and recovers forward blocking characteristics periodically. This controls the current to the load despite failure of the load to develop a counter e.m.f.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A common bus energization system comprising, in combination,
   a first bus conductor,
   a second bus conductor,
   means for connecting a plurality of individual loads in parallel between said bus conductors,
   said loads including reactances capable of operating on direct current and a controllable semi-conductor connected to control the current therethrough,
   voltage source means including first means connected to supply a first unidirectional voltage between said first and second bus conductors which for a majority of the time is positive on said first conductor,
   and said voltage source means including second means to establish a second voltage between said first and second bus conductors to establish with said first voltage a resultant voltage positive on said first conductor for a majority of time and negative on said first conductor for a minority of time for a net average polarity of a positive voltage on said first conductor.

2. A common bus energization system as set forth in claim 1 wherein said voltage source means establishes alternate effectiveness of said first and second means at a periodic rate.

3. A common bus energization system as set forth in claim 2 wherein said periodic rate is proportional to the frequency of an alternating voltage source supplying power to said voltage source means.

4. A common bus energization system as set forth in claim 3 wherein said periodic rate is twice the frequency of the alternating voltage source.

5. A common bus energization system as set forth in claim 2 wherein said periodic rate is at a higher frequency unrelated to the frequency of an alternating voltage source supplying power to said voltage source means.

6. A system as set forth in claim 2 including means for controlling at least one of said individual loads by control of the controllable semiconductor connected therewith and synchronized at said periodic rate.

7. A system as set forth in claim 3 including means for controlling at least one of said individual loads by triggering the controllable semiconductor connected therewith in synchronism with the frequency of the alternating voltage source,
   said negative voltage portions of said resultant voltage periodically on said first conductor assuring that the controllable semiconductor ceases conduction and recovers forward blocking characteristics periodically to control the current to the load despite failure of the load to develop a counter e.m.f.

8. A system as set forth in claim 2 including control means having means to establish the periodic rate at a frequency unrelated to commercially available power frequencies.

9. A common bus energization system as set forth in claim 1 wherein said first means of said voltage source means includes a main rectifier supplying power to said plurality of loads,
   and said second means of said voltage source means includes a smaller rectifier supplying voltage but only minimal amounts of power due to the unidirectional character of the loads.

10. A system as set forth in claim 1 including a filter on said second means of said voltage source means to establish a filtered negative direct voltage,
    and said first means of said voltage source remaining unfiltered to have periodically instances of substantially zero voltage difference between said first and second conductors.

11. A common bus energization system as set forth in claim 1 wherein said first means of said voltage source means includes a rectifier and said second means of said voltage source means includes a series connection of diodes establishing a voltage in series with the voltage of said first means.

12. A common bus energization system as set forth in claim 1 wherein said second means of said voltage source means establishes a voltage which is connected in shunt to the voltage output of said first means.

13. A common bus energization system as set forth in claim 1 wherein said first means of said voltage means includes a chopper voltage supply.

14. A system as set forth in claim 1 wherein said first means includes a chopper and said second means includes a shunt bias source.

15. A system as set forth in claim 1 wherein said first and second means are included in a chopper of a half-bridge configuration.

16. A system as set forth in claim 1 wherein said first and second means are included in a full bridge chopper.

* * * * *